United States Patent
Pywell et al.

(10) Patent No.: US 6,305,713 B1
(45) Date of Patent: *Oct. 23, 2001

(54) FOUR POINT RESTRAINT APPARATUS

(75) Inventors: James Frederick Pywell, Shelby Township; Stephen William Rouhana, Rochester Hills; John William Melvin, Ann Arbor; Joseph D. Mc Cleary, Clinton Township; John Robert Hiben, Dryden; Raymond J. Saydak, Clinton Township; Kenneth H. De Saele, Armada, all of MI (US)

(73) Assignee: General Motors Corporation, Detroit, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 09/472,287

(22) Filed: Dec. 27, 1999

(51) Int. Cl.⁷ .................................................. B60R 22/48
(52) U.S. Cl. ........................ 280/801.1; 280/806; 280/808; 297/484
(58) Field of Search ................................ 280/801.1, 806, 280/807, 808; 297/468, 484, 486, 474, 475, 476, 477, 478, 479, 480; 180/216.1, 268

(56) References Cited

U.S. PATENT DOCUMENTS

| 3,822,915 | 7/1974 | Colucci | 297/389 |
|---|---|---|---|
| 3,924,613 | 12/1975 | Beck | 128/24 R |
| 4,175,787 | * 11/1979 | Muskat | 297/484 |
| 4,854,608 | * 8/1989 | Barral | 280/805 |
| 5,676,398 | 10/1997 | Nurtsch | 280/806 |
| 5,788,177 | * 8/1998 | Keller et al. | 242/379.1 |
| 5,897,169 | * 4/1999 | Larsen et al. | 297/483 |
| 5,913,486 | 6/1999 | Pywell et al. | 242/374 |
| 5,971,488 | * 10/1999 | Pedronno et al. | 297/468 |
| 6,050,635 | * 4/2000 | Pajon et al. | 297/216.1 |
| 6,076,894 | * 6/2000 | Busch | 297/484 |
| 6,135,561 | * 10/2000 | Kruger et al. | 297/408 |
| 6,139,111 | * 10/2000 | Pywell et al. | 297/484 |

FOREIGN PATENT DOCUMENTS 1-94053 * 4/1989 (JP) ........................... 297/484

* cited by examiner

Primary Examiner—Daniel G. DePumpo
Assistant Examiner—David R. Dunn
(74) Attorney, Agent, or Firm—George A. Grove; Jeffrey A. Sedlar

(57) ABSTRACT

A four point restraint apparatus for a vehicle includes in a preferred embodiment a first pair of flexible lap belts connected at laterally opposite sides of a seat cushion with inner ends transversely connectable to one another across pelvic regions of an occupant and a second pair of flexible shoulder belts connected to a support in the vehicle body and extending forward of the seat back adjacent the neck and across the clavicle of the occupant. The shoulder belts extend from the clavicle essentially parallel downward across front edge portions of the occupant's rib cage to laterally spaced attachment with the lap belts adjacent pelvic regions of an occupant. Additional features of the preferred apparatus include a ramp sloping upward toward a forward edge of the cushion; an upwardly adjustable load-carrying headrest in the seat back for guiding the shoulder belts over the clavicle of an occupant; a load-limiting retractor or laterally spaced dual load-limiting retractors connecting the shoulder belts to the seat back; one or more dynamic pretensioners connected with the lap belts; and maintaining the spacing of the shoulder belts at a constant approximately 62.5 mm lateral offset in opposite directions from a center of the occupant's position over a distance from the clavicle of the occupant to connection with the lap belts.

9 Claims, 8 Drawing Sheets

FOUR POINT RESTRAINT APPARATUS

TECHNICAL FIELD

This invention relates to apparatus for restraining an occupant in an automotive vehicle seat during rapid deceleration. More particularly, the invention relates to a four point restraint apparatus.

BACKGROUND OF THE INVENTION

It is known in the automotive vehicle art to provide various types of seat belts or restraint apparatus for restraining an occupant in the seat and providing controlled deceleration of portions of the body to limit the forces applied to the occupant's body during rapid deceleration of a vehicle from a cause such as a collision. Four point restraint apparatus are among the many types provided for use in various types of vehicles.

SUMMARY OF THE INVENTION

The present invention provides a four point restraint apparatus designed to reduce and distribute forces applied to the body of an occupant during rapid deceleration conditions. As used herein, the term "cushion" conventionally refers to the body supporting lower portion of a seat and, in particular, to the structural cushion frame assembly to which cushion materials are typically attached. The term "seat back" similarly refers to a back supporting portion and, particularly, to the structural seat back frame which is connected to the cushion and to which cushion materials are typically also attached.

In a preferred form, an apparatus according to the invention includes:

a seat having a cushion mountable on a vehicle underbody and a seat back connected with the cushion;

a first pair of flexible lap belts connected at laterally opposite sides of the seat through at least one dynamic pretensioner and having inner ends transversely connectable to one another across pelvic regions of the occupant;

a second pair of flexible shoulder belts connected to a support in the body through at least one load-limiting retractor and, when in use, extending in parallel relation forward of the seat back, passing closely adjacent the neck portion and across the clavicle of the occupant from points not below the level of the clavicle, the shoulder belts extending, essentially parallel, downward across front edge portions of the occupant's rib cage to laterally-spaced attachment with said lap belts; and adjustable guides on the seat back for guiding the shoulder belts over the clavicle to limit downward force on the clavicle prior to an occurrence of rapid vehicle deceleration. preferably, the shoulder belts are connected to a fixed support in the vehicle body spaced and directly centered behind the back portion of the seat; however, they could instead be connected to another suitable location on the body or on the seat.

Additional features included in the apparatus are:

the load-limiting retractor, or laterally-spaced dual load-limiting retractors, connecting the shoulder belts to the support to allow controlled extension of the shoulder belts upon reaching a predetermined deceleration load;

preferably, dual pretension retractors, mounted on laterally opposite sides of the seat and connected with the lap belts to provide dynamic pretensioning of the lap belts upon reaching a predetermined deceleration value;

a ramp sloping upward near the forward edge of the seat cushion and being effective to prevent sliding of the body of an occupant forward under the transversely-connected lap belts during rapid slowing of the vehicle;

an upwardly adjustable load carrying headrest on the seat back providing the adjustable guides for guiding the shoulder belts over the clavicle of an occupant; and maintaining the spacing of the shoulder belts at a constant approximately 62.5 mm lateral offset in opposite directions from a centerline through the position of the occupant over a distance from the clavicle of the occupant to laterally-spaced attachment to the lap belts adjacent pelvic regions of the occupant.

These and other features and advantages of the invention will be more fully understood from the following description of certain specific embodiments of the invention taken together with the accompanying drawings.

DESCRIPTION OF THE PREFERRED EMBODIMENT

Figure 1:
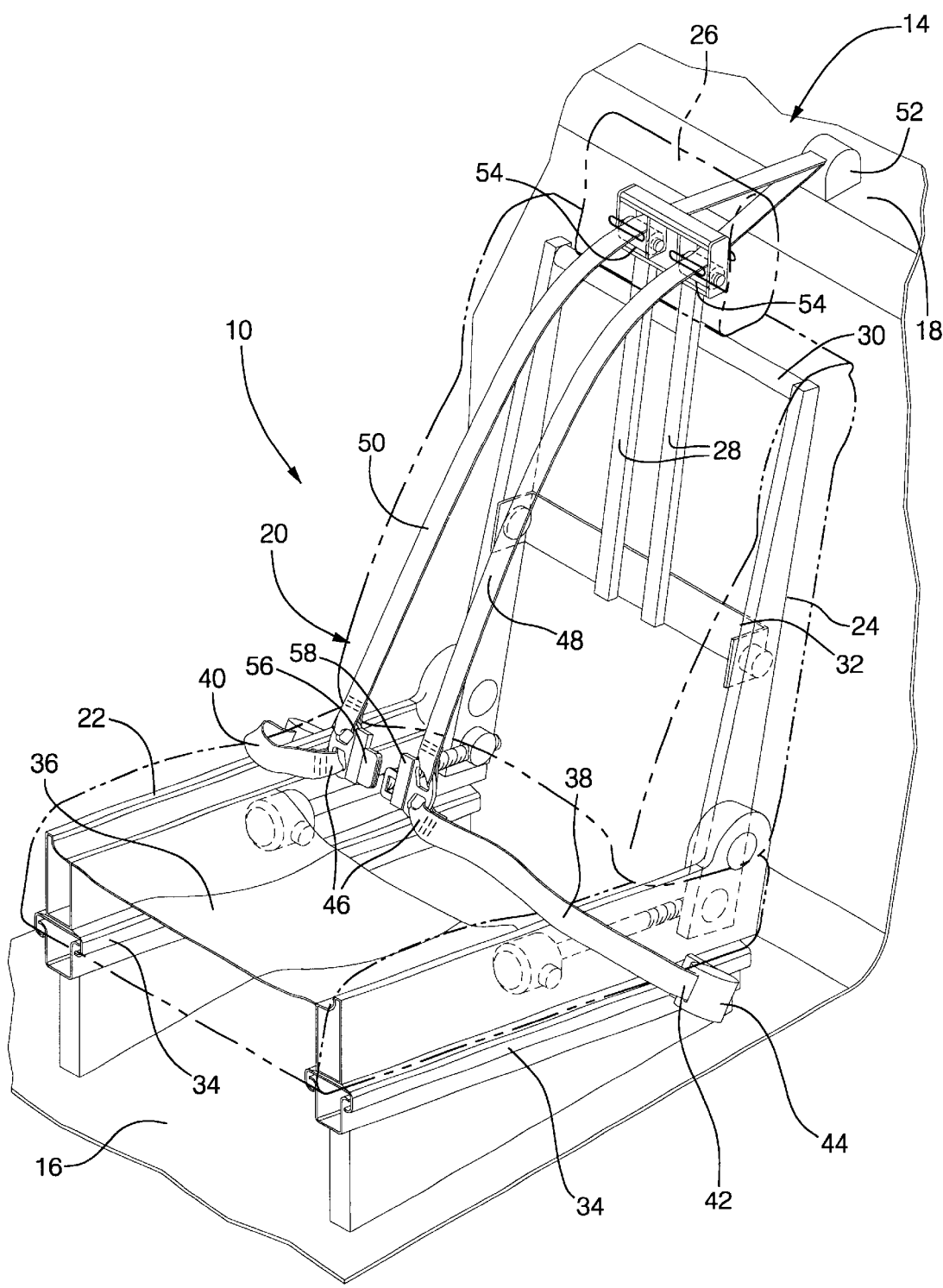
FIG. 1 is a fragmentary pictorial view of a vehicle restraint apparatus incorporating a seat with a four point restraint apparatus according to the invention.
Figure 2:
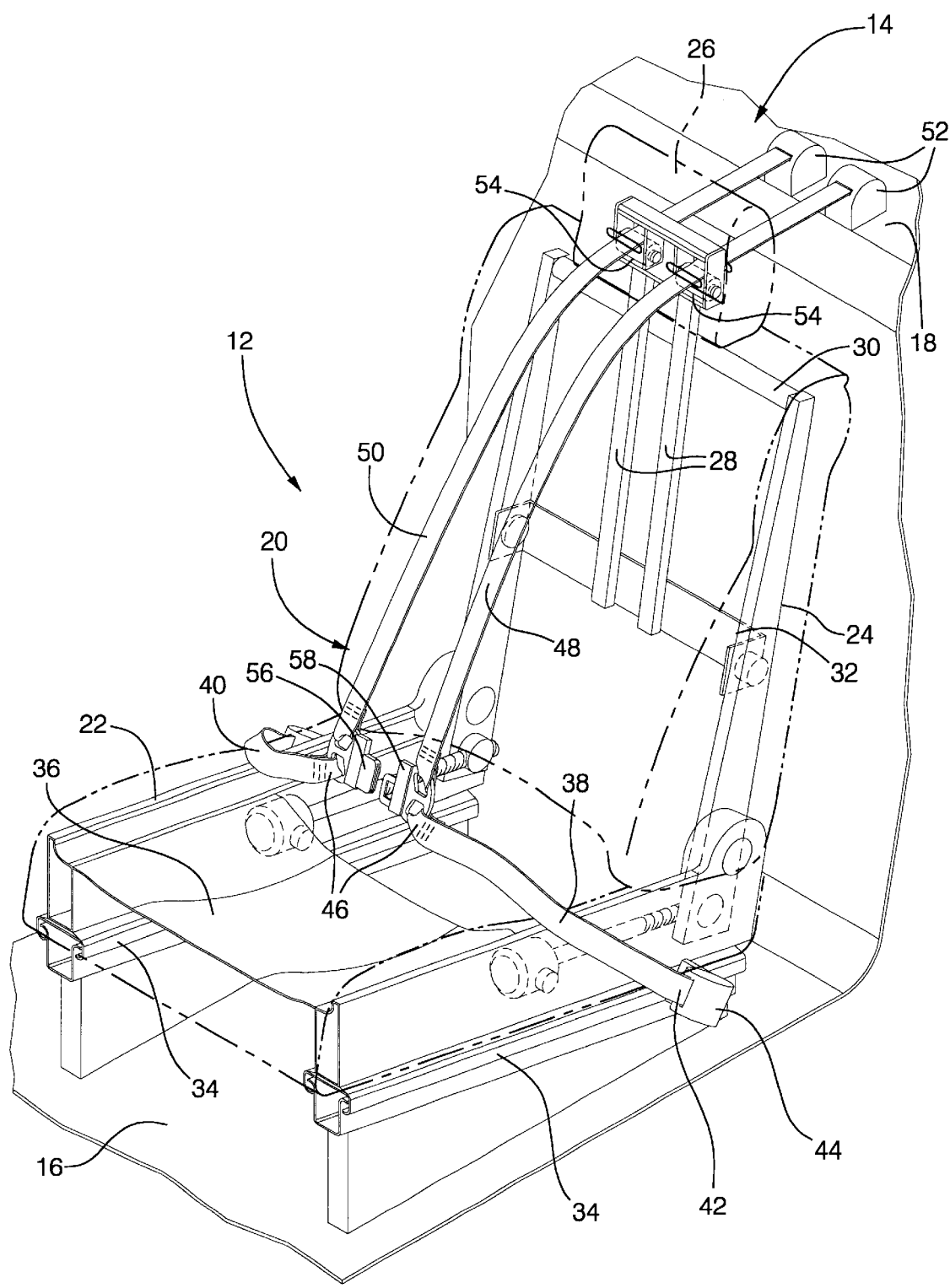
FIG. 2 is a view similar to FIG. 1 showing a second embodiment of the invention.

Referring first to FIGS. 1–6 of the drawings, there are shown two similar embodiments of the application of four point restraint apparatus according to the invention. Two different embodiments of the restraint apparatus applying four point restraints are shown by numeral 10 in FIG. 1 and numeral 12 in FIG. 2.

Each apparatus 10, 12 includes a vehicle body 14 having an underbody 16 and a transverse rear bulkhead or other vehicle structure defining a fixed support 18. A seat 20 is included having a cushion 22 and a seat back 24, referring in particular to their underlying structural frame assemblies. Preferably, an adjustable headrest 26 is also provided which is mounted on vertically adjustable headrest supports 28 that are adjustably connected with lateral cross members 30, 32 in the seat back.

The cushion 22 of the seat 20 is conventionally mounted on the underbody 16, preferably on structural seat adjusters 34, located along the bottoms of the sides of the seat, which allow forward and aft adjustment of the seat on the underbody. The cushion 22 of the seat includes an anti-submarining ramp 36 having a surface sloping upward near the forward edge of the cushion. The underlying portions of the seat structure, which are shown and referred to in the figures, are conventionally covered by suitable materials for comfortably seating the occupant and providing cushion to the occupant's body. These covering materials are shown in phantom in some of the drawings so that the underlying seat structure may be more clearly illustrated.

The four point restraint apparatus 10, 12 further includes a first pair of flexible belts 38, 40, commonly called seat belts or lap belts. Lap belts 38, 40 have outer ends 42 connected to laterally opposite sides of the structural seat adjusters 34. The outer ends 42 are connected to the seat by some form of pretensioner. In the present instance, dual pretension retractors 44 are used, one connected to each of the belts 38, 40. Inner ends 46 of the belts 38, 40 are connectable to one another by any suitable means so that, when in use, lap belts 38, 40 extend transversely across the pelvic regions of the occupant to positively restrain the occupant in the seat during rapid deceleration conditions.

The restraint apparatus additionally includes a second pair of flexible shoulder belts 48, 50. These shoulder belts are connected at rear ends to the fixed support 18 of the body. Alternatively, they could be connected to another fixed support in the body or in the associated seat itself. In the apparatus 10 of FIG. 1, the rear ends of the shoulder belts 48, 50 are joined together and connected to a single load-limiting retractor 52 mounted on the support 18. In the alternative apparatus 12 of FIG. 2, the two shoulder belts are connected separately to individual load-limiting retractors 52 mounted on support 18. In both cases, the shoulder belts 48, 50 extend forward to pass through openings or slots in the associated headrest 26, being guided by bearing rollers 54 which are mounted in the headrest. The rollers 54 transmit compressive loads between the shoulder belts and adjustable headrest supports 28, connected with the associated seat backs 24, during periods when the belts are loaded during use. The headrest 26 is adjusted so that the bearing rollers are above, or at least not below, the level of an occupant's shoulders so as to avoid application of downward forces on the occupant.

The rollers 54 are set to guide the shoulder belts 48, 50 at an offset distance of 62.5 mm more or less from a centerline 55 (FIG. 5), which represents the center of the intended position of an occupant's body when located in the seat. The shoulder belts are thus spaced essentially 125 mm apart as they pass over the shoulders or clavicle of an occupant and past the neck portion of the body. The belts 48, 50 then turn downward, remaining parallel and extending across the front edge portions of the occupant's rib cage and are attached at equally laterally-spaced locations with the first pair of flexible lap belts 38, 40. preferably, the shoulder belt 50 and lap belt 40 on the right side are attached together at their lower and inner ends and the shoulder belt 48 and lap belt 38 on the left side are attached together at their lower and inner ends, and the two sections are connected by a suitable buckle or buckle and latch assembly 56 which is easily actuated by the occupant when putting on the restraint apparatus.

Figure 3:
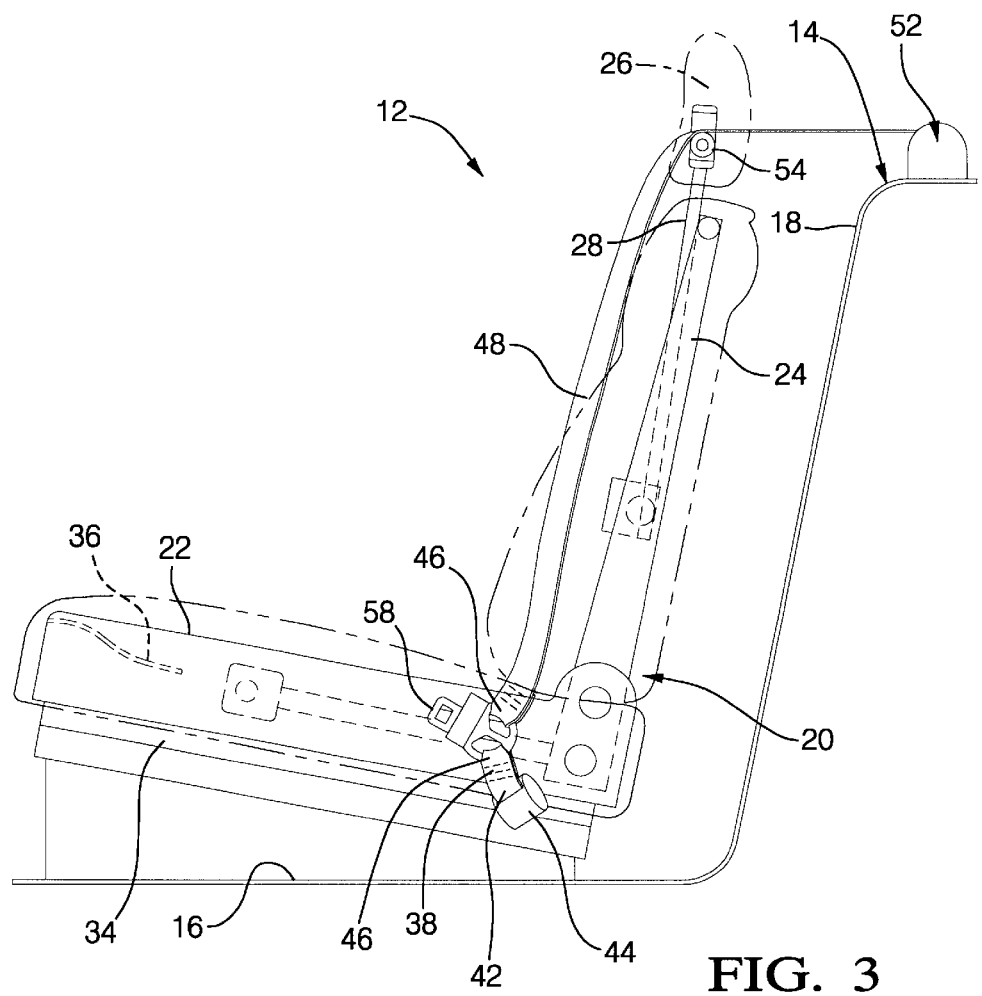
FIG. 3 is a side view of the embodiment of FIG. 2 but showing the lap and shoulder belts in a retracted position.

FIG. 3 shows in side view the form of the seat 20 and, in particular, a preferred shape for the ramp 36. The lap belt 38 and shoulder belt 48 are shown retracted and the long retracted length of the shoulder belt is illustrated.

Figure 4:
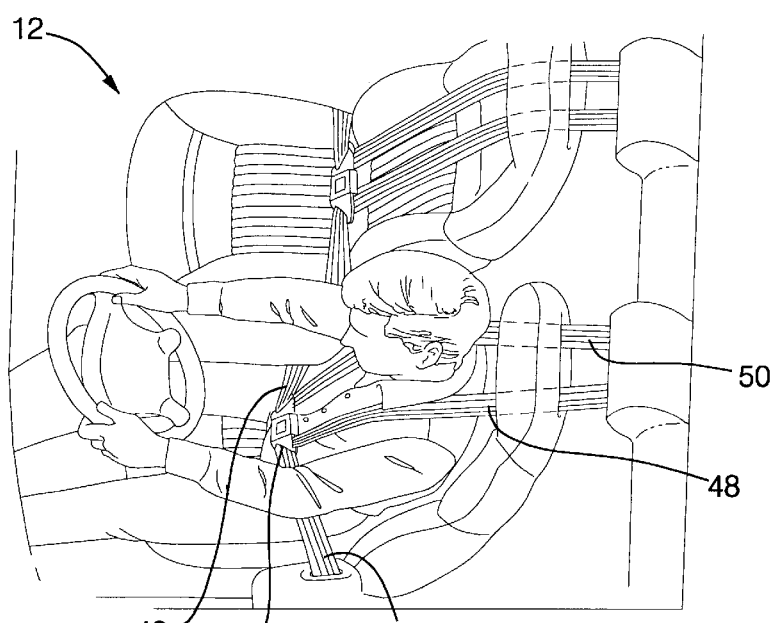
FIG. 4 is a pictorial view showing the embodiment of FIG. 2 in use in a vehicle.

FIG. 4 illustrates the application of the restraint apparatus in the front compartment of a vehicle with the driver in position belted in place in the driver's seat.

Figure 5:
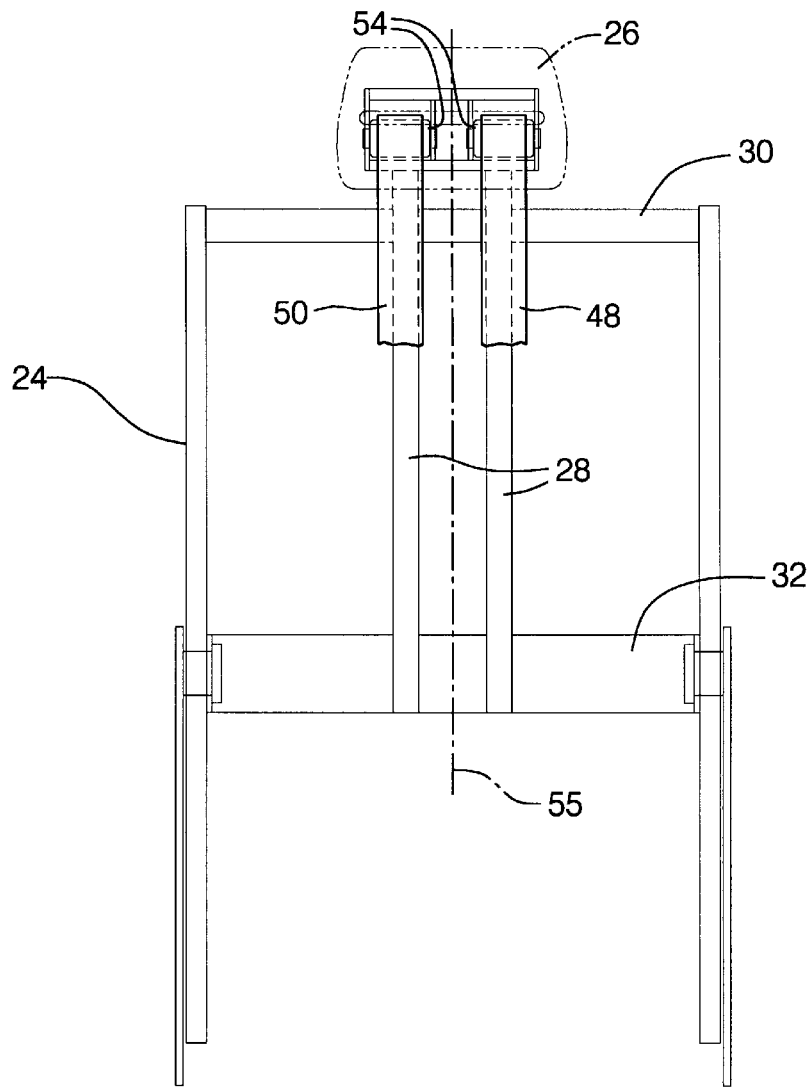
FIG. 5 is a front elevational view illustrating shoulder belts guided by rollers in an adjustable headrest.

FIG. 5 illustrates more clearly the mounting of the headrest 26 on the seat back 24 of the seat with the shoulder belts 48, 50 extending through slots in the headrest and over the associated rollers 54.

Figure 6:
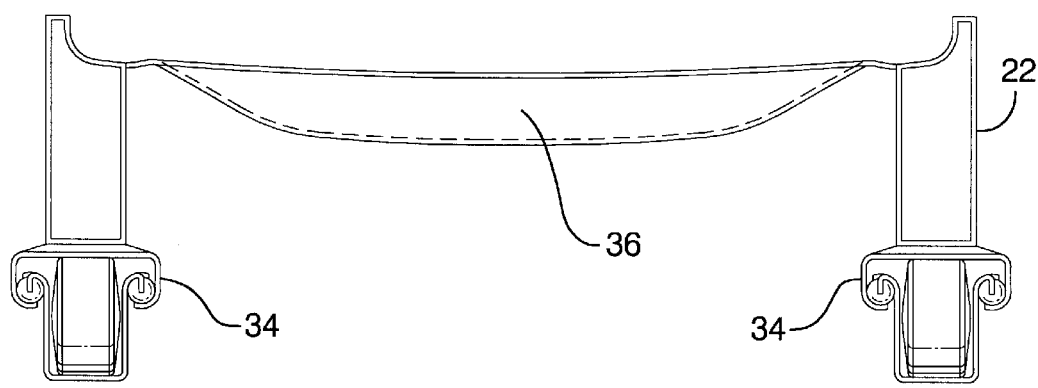
FIG. 6 is a partial front elevational view of the seat cushion showing the anti-submarining ramp.

FIG. 6 illustrates the front of cushion 22 of the seat and, in particular, the shape of the ramp 36 at the forward portion of the occupant's seat area.

Figure 7:
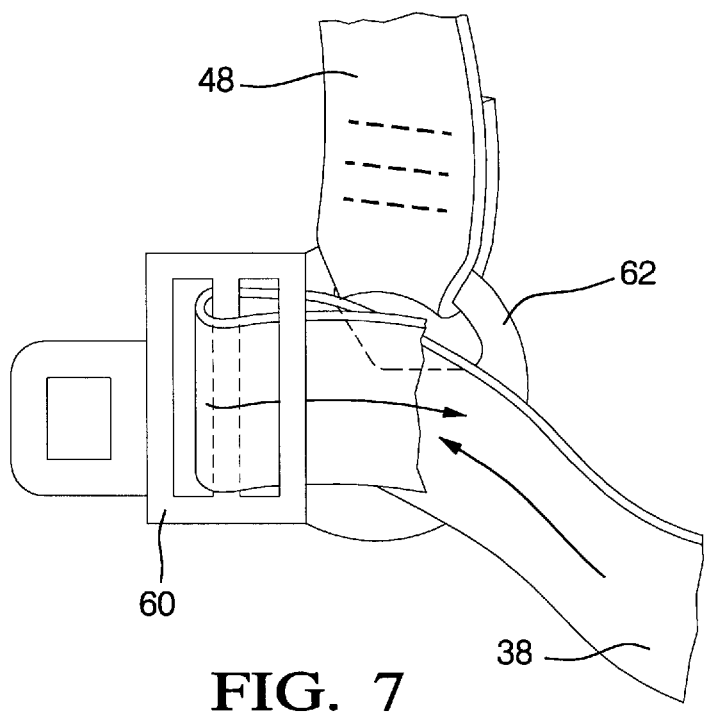
FIG. 7 is a pictorial view illustrating one form of belt attachment hardware.

Referring now to FIG. 7, there is shown one alternative form of connection of the lap belt 38 held in a clinching latch plate 60 with the shoulder belt 48 in an accompanying stitched latch plate 62 mounted together to form a single latch component.

Figure 8:
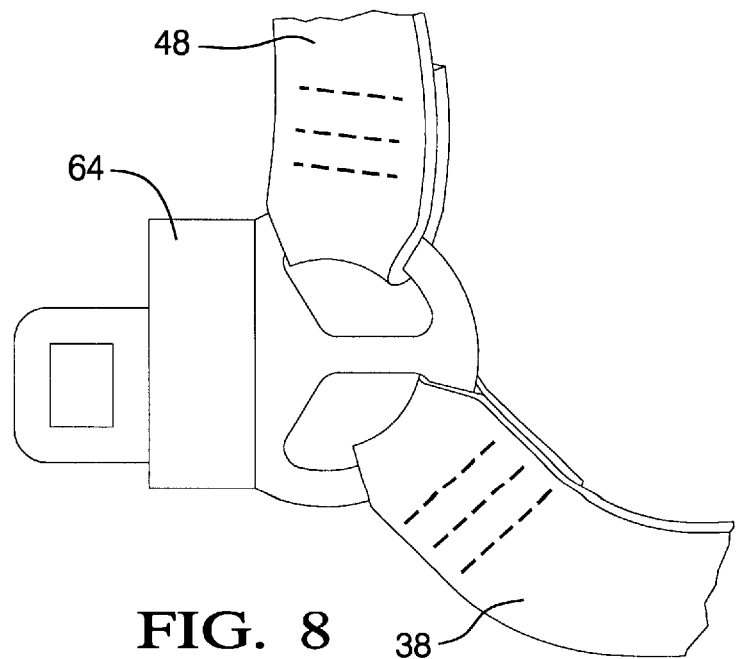
FIG. 8 is a pictorial view illustrating a preferred form of belt attachment hardware.

FIG. 8 illustrates a preferred embodiment wherein both the shoulder belt 48 and lap belt 38 are stitched to the latch plate 64.

Figure 9:
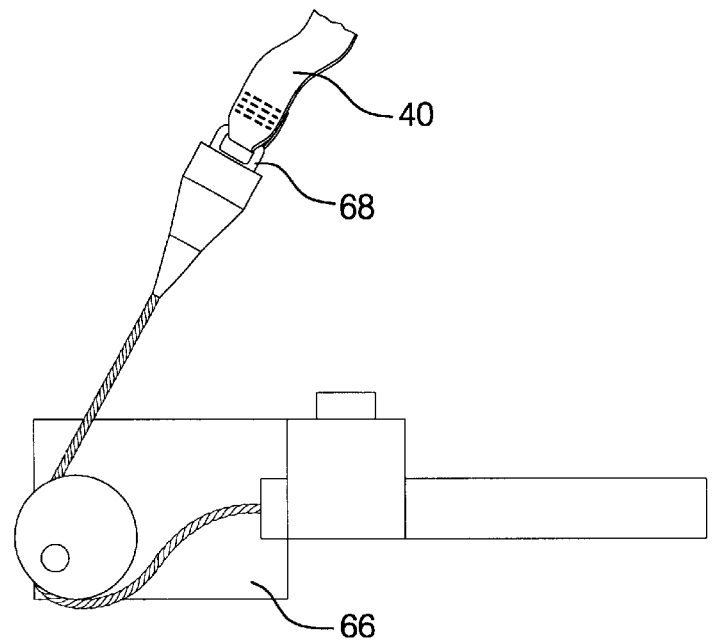
FIG. 9 is a side view showing a first form of lap belt pretensioner.

FIG. 9 illustrates one form of pretensioner 66 connected to a stitched head 68 for constant attachment with a lap belt 40.

Figure 10:
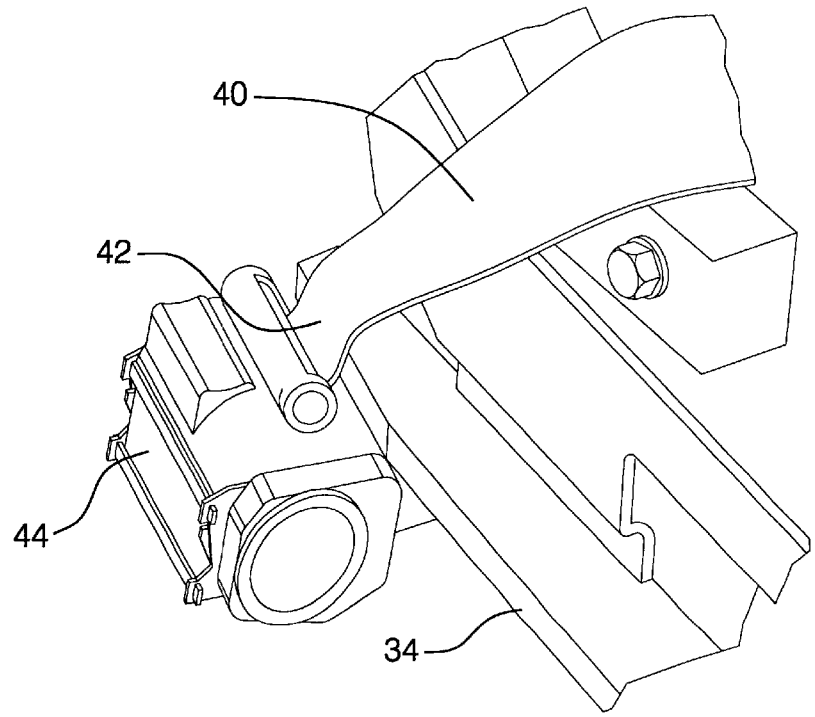
FIG. 10 is a pictorial view illustrating a lap belt retractor pretensioner application.

FIG. 10 shows a preferred embodiment wherein the lap belt 40 outer end 42 is connected to a non-load limiting pre tensioning retractor 44 mounted on a structural seat adjuster 34 near its rear end along the bottom of a side of the seat.

Figure 11:
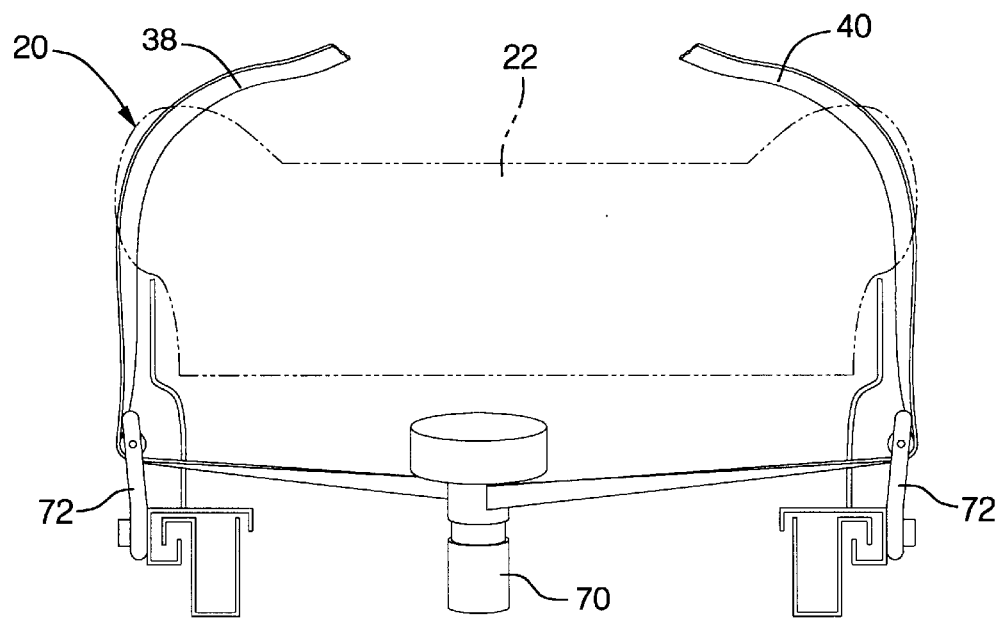
FIG. 11 is a rear view showing application of a centrally mounted retractor pretensioner.

FIG. 11 illustrates still another alternative embodiment wherein an under seat, centrally-mounted retractor pretensioner 70 is provided to engage the outer ends 42 of lap belts 38, 40 which are drawn through roller bearing guides 72 at the sides of the seat 20 and extend upward in otherwise conventional fashion.

Figure 12:
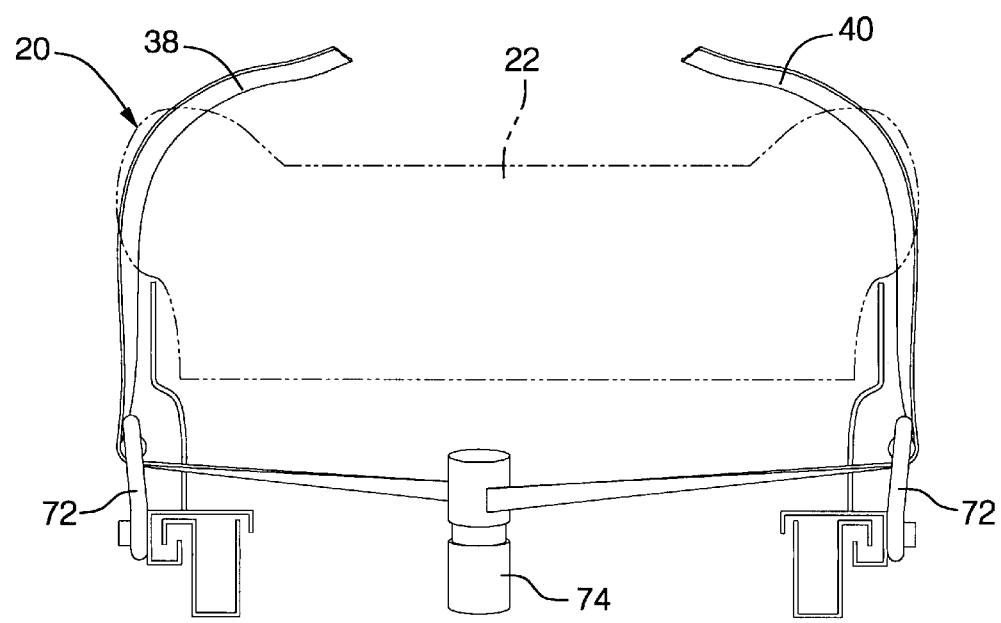
FIG. 12 is a rear view similar to FIG. 11 showing a hypertensioner in place of the pretensioner.

FIG. 12 shows still another embodiment wherein a hypertensioner 74 (such as in U.S. Pat. No. 5,913,486, issued Jun. 22, 1999) is substituted for the under seat pretensioner 70 of FIG. 11.

Figure 13:
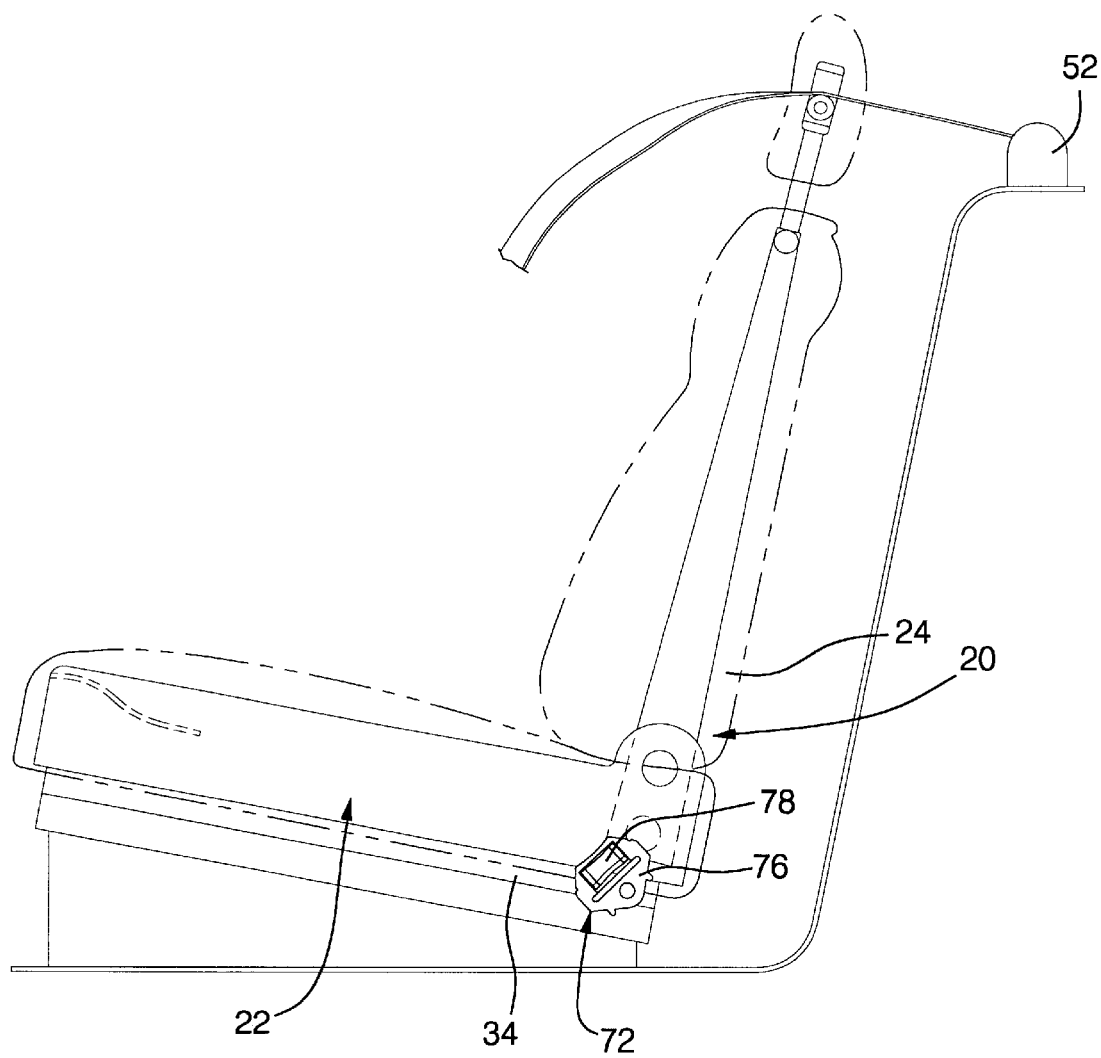
FIG. 13 is a side view illustrating a lap belt anchor roller bearing for use with the embodiments of FIGS. 11 and 12.

FIG. 13 illustrates, in particular, a roller bearing guide 72 having a lap belt anchor plate 76 with a roller bearing 78 for guiding the belt from the side of the seat to the underneath portion for connection to a centrally-mounted pretensioner or hypertensioner.

In operation of the various embodiments of the restraint apparatus 10, 12 described, all of the various components provide important functions. The parallel positioning of the dual shoulder belts 48, 50 properly positions the belts to provide maximum restraint to the body at preferred locations. In a preferred embodiment, the shoulder belts are offset 62.5 mm in opposite directions from a bodily position centerline. This is controlled by guide rollers 54 which guide the belts 48, 50 through slots in the headrest or seat back. The shoulder belts are positioned to pass over the clavicle on the inner shoulder portion of the occupant's body closely adjacent the neck in a position where maximum restraining force may be applied. The belts 48, 50 then pass down in parallel fashion along the forward edges of the rib cage to connection with associated lap belts 48, 50. This maintains the desired positions of the shoulder belts.

The use of a long shoulder belt length extending from the load limiting retractors 52 to the seat cushion is desired because it allows the shoulder belts to be donned with minimal tension, thereby insuring that the buckle starts low on the lap. Upon sufficiently rapid deceleration of the vehicle, the load limiting retractors allow the user's upper body to displace forward, minimizing restraint loads. Here, the load-limiting retractors 52 have the function of allowing controlled motion of the body only when a prescribed load limit is reached, thus maintaining controlled forces on the torso during a rapid stop of the vehicle.

To restrain the lower torso of the occupant within the seat during rapid deceleration, the lap belts are provided with non-load limiting dynamic pretensioner retractors 44. These are operative upon initial sensing of a rapid deceleration to apply increased tension on the lap belt and resultant restraint on the pelvic regions of the occupant by drawing the outer edges of the lap belt down to tension it tightly across the pelvic regions of the body and prevent the occupant's torso from sliding under the lap belt during the deceleration occurrence. Such anti-submarining action is aided by the shape and location of the anti-submarining ramp 36 at the forward portion of the seat cushion 22. The upward slope of ramp 36 causes the seat portion of the occupant's body to be supported against the ramp while the lap belt tensions with a substantial force on the pelvic region, thus restraining the lower portion of the body in position in the seat and preventing the body from sliding underneath the lap belt. This provides an important function by controlling the occupant's kinematics within the vehicle seat during a rapid deceleration.

Some of the functions described may, of course, be provided by suitable alternative devices in place of the particular devices of the described embodiments. However, it is presently considered that use of all features of the invention or their equivalents is necessary to the satisfactory operation of the apparatus in its broadest sense as herein described and claimed.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. Apparatus for restraining an occupant in an automotive vehicle seat, said apparatus comprising:

a seat having a cushion mountable on a vehicle underbody and a seat back connected with the cushion, the seat including a ramp sloping upward toward a forward edge of the cushion;

a pair of flexible lap belts connected at laterally opposite sides of the seat and having inner ends transversely connectable to one another across pelvic regions of the occupant, the lap belts connected with at least one dynamic pretensioner;

a pair of flexible shoulder belts connected to a support through at least one load limiting retractor and adapted, when in use, to extend in parallel relation forward of the seat back, passing closely adjacent the neck portion and across the clavicle of the occupant from points not below the level of the clavicle, and to extend, essentially parallel, downward across front edge portions of the occupant's rib cage to laterally spaced attachment with said lap belts; and adjustable guides on the seat back for guiding the shoulder belts to limit downward force on the clavicle prior to an occurrence of rapid vehicle deceleration.

2. Apparatus as in claim 1 wherein said adjustable guides in the seat back are disposed in an upwardly adjustable load-carrying headrest.

3. Apparatus as in claim 1 wherein said at least one load-limiting retractor is effective to allow controlled extension of the shoulder belts upon reaching of a predetermined deceleration load.

4. Apparatus as in claim 1 wherein said at least one load limiting retractor comprises laterally spaced dual load limiting retractors connecting said shoulder belts to said support.

5. Apparatus as in claim 1 wherein said at least one dynamic pretensioner comprises dual pretension retractors mounted at laterally opposite sides of the seat.

6. Apparatus as in claim 1 wherein:

the ramp prevents sliding of an occupant forward under the lap belts during rapid slowing of the vehicle;

said at least one load-limiting retractor is effective to allow controlled extension of the shoulder belts upon reaching of a predetermined deceleration load; and said at least one dynamic pretensioner is effective to provide dynamic pre tensioning of the lap belts upon reaching of a predetermined deceleration value.

7. Apparatus as in claim 6 wherein:

said adjustable guides on the seat back are disposed in an upwardly adjustable load carrying headrest having rollers for guiding the shoulder belts over the clavicle of an occupant.

8. Apparatus as in claim 7 wherein:

said shoulder belts are connected to said support through laterally-spaced dual load-limiting retractors; and said lap belts are connected to the cushion through dual pretension retractors mounted on structural seat adjusters at said laterally opposite sides of the seat.

9. Apparatus as defined in claim 1 wherein said essentially parallel spacing of the shoulder belts is adapted to be maintained at an essentially constant spacing of about 62.5 mm lateral offset in opposite directions from a center of an intended position of the occupant and over a distance from the clavicle of the occupant to laterally spaced attachment to the lap belts adjacent pelvic regions of the occupant.

* * * * *